United States Patent
Nagaoka

(10) Patent No.: US 7,174,586 B2
(45) Date of Patent: Feb. 13, 2007

(54) OPERATION CONTROL APPARATUS FOR ELECTRIC BED

(75) Inventor: Hiroshi Nagaoka, Tokyo (JP)

(73) Assignee: Paramount Bed Co., Ltd., Tokyo (JP)

( * ) Notice: Subject to any disclaimer, the term of this patent is extended or adjusted under 35 U.S.C. 154(b) by 91 days.

(21) Appl. No.: 10/962,711

(22) Filed: Oct. 13, 2004

(65) Prior Publication Data

US 2005/0077859 A1  Apr. 14, 2005

(30) Foreign Application Priority Data

Oct. 14, 2003  (JP) ............................. 2003-354326

(51) Int. Cl.
- A47B 23/02   (2006.01)
- A47C 20/00   (2006.01)
- A47C 13/00   (2006.01)
- G05B 19/18   (2006.01)
- G05D 1/02    (2006.01)
- G05D 1/10    (2006.01)
- G06F 12/00   (2006.01)

(52) U.S. Cl. .............................. 5/509.1; 5/607; 5/616; 5/618; 5/633; 700/60; 700/64; 700/302; 297/63; 711/159

(58) Field of Classification Search ............... 5/600, 5/607, 610–614, 616–619, 632–634, 658, 5/510, 509.1; 700/56, 60–62, 64, 302; 297/63–66
See application file for complete search history.

(56) References Cited

U.S. PATENT DOCUMENTS

| | | | | |
|---|---|---|---|---|
| 4,250,439 A | * | 2/1981 | Hohmann | 318/601 |
| 4,435,862 A | * | 3/1984 | King et al. | 5/611 |
| 4,659,145 A | * | 4/1987 | Obersteiner | 297/330 |
| 4,660,886 A | * | 4/1987 | Terada et al. | 297/367 |
| 4,688,498 A | * | 8/1987 | Carlson | 112/102.5 |
| 4,961,236 A | * | 10/1990 | Luconi | 5/616 |
| 5,940,911 A | * | 8/1999 | Wang | 5/610 |
| 6,064,932 A | * | 5/2000 | Fran.cedilla.ois | 701/49 |
| 6,469,263 B1 | * | 10/2002 | Johnson | 177/144 |
| 2002/0124320 A1 | * | 9/2002 | Washburn et al. | 5/713 |
| 2004/0133982 A1 | * | 7/2004 | Horitani et al. | 5/618 |

FOREIGN PATENT DOCUMENTS

| JP | 2865161 | 12/1998 |
|---|---|---|
| JP | 2003325590 A | * 11/2003 |

* cited by examiner

Primary Examiner—Crystal J. Barnes
(74) Attorney, Agent, or Firm—McGinn IP Law Group, PLLC

(57) ABSTRACT

An MPU sends pieces of information supplied by the input signals from a hand switch to a semiconductor memory device and the memory device stores these pieces of information. These pieces of information are: input points of an operation start signal and an operation end signal to a bottom drive unit; input points of a drive start signal of each bottom and a drive end signal of each bottom or a bottom drive time, information on lift-up or lift-down of each bottom; input points of a drive start signal and a drive end signal to a frame drive unit, information on lift-up or lift-down of a frame; and the type of an operated button of a hand switch. The data about bottoms is stored for both the back bottom and knee bottom.

8 Claims, 1 Drawing Sheet

OPERATION CONTROL APPARATUS FOR ELECTRIC BED

BACKGROUND OF THE INVENTION

1. Field of the Invention

The present invention relates to an operation control apparatus for an electric bed, which controls the lift-up and lift-down operation of a back bottom of a bed for a medical use or a nursing care use, the lift-up and lift-down operation of a knee bottom of the bed and the lift-up and lift-down operation of the whole bed.

2. Description of the Related Art

Beds for a medical use or a nursing care use are designed to be able to change the tilt angles of the back bottom and knee bottom of each bed or change the height of the frame of the bed so as to change the posture of the patient and the overall height of the bed, for the need of a treatment or care or in order to keep or improve the degree of independency of a person of advanced years or a disabled person.

In case of a home bed, particularly, a patient or a caretaker operates a switch on a remote control unit to lift up the back bottom and the knee bottom, lift up the frame, or lift down the back bottom and the knee bottom, lift down the frame, thereby adjusting the back angle and the knee angle or adjusting the overall height of the bed. In this case, the use conditions vary according to the environment and there is a possibility that various problems occur. Such a trouble may cause abnormality in the bed. While a caretaker or a patient operating the remote control unit, however, the caretaker or patient cannot clearly detect what has happened immediately before the occurrence of abnormality. Even when a service engineer diagnoses the electric bed after the occurrence of abnormality, therefore, it is often the case that the engineer does not find the cause of the abnormality and takes time in repair.

Under the nursing care insurance system, a care manager who creates a care plan for a person of advanced years cannot know how the person of advanced years is using an electric bed introduced according to the care plan and cannot verify if the care plan prepared himself or herself is adequate.

When some sort of trouble occurs in an electric bed, the situations before and after the trouble cannot be known, disabling the investigation of the cause of the trouble.

An operation control system for an electric bed equipped with an operation recording function has been proposed (see, for example, Japanese Patent No. 2865161). This system accumulates and records the operation time and the number of operations for each bed and ensure reading of those records to perform a maintenance of the bed, but is not useful in investigating the cause of abnormality and examination of the optimal care plan.

SUMMARY OF THE INVENTION

Accordingly, it is an object of the invention to provide an operation control apparatus for an electric bed, which can detect an operation of the bed immediately before abnormality or failure, facilitating investigation of the cause of a trouble, and can easily grasp the operational history of the bed.

To achieve the object, according to the invention, there is provided an operation control apparatus for an electric bed which has a bottom drive member for lifting up and down at least one of a back bottom and a knee bottom tiltably attached to a frame and a frame drive member for lifting up and down the frame and which operates the bottoms and frame of the bed by driving the bottom drive member or the frame drive member in response to a signal from a remote control switch or a fixed switch. The operation control apparatus includes a memory device which stores operation start points and operation end points of the bottom drive member and the frame drive member, a drive start point of each bottom and a drive end point of each bottom or a drive time of each bottom, a type of a lift-up or lift-down operation of each bottom, a drive start point and a drive end point of the frame, and a type of a lift-up or lift-down operation of the frame or a type of an operated button of the remote control switch or the fixed switch; and an output unit which outputs memory contents of the memory device in response to an external request signal.

In the operation control apparatus, it is preferable that the output unit should transfer output data to a personal computer. The memory device may store data whose amount is equal to or less than a capacity of the memory device, starting from latest data, in a memory section.

As the operational history of the electric bed is stored in the memory device in the invention, it is possible to know operation contents (manipulation contents) immediately before the occurrence of a trouble and know the operational history indicating what operations a patient or a caretaker has taken, so that the analysis of the cause of a trouble and a check on a care plan can be performed effectively.

DETAILED DESCRIPTION OF THE PREFERRED EMBODIMENT

Figure 1:
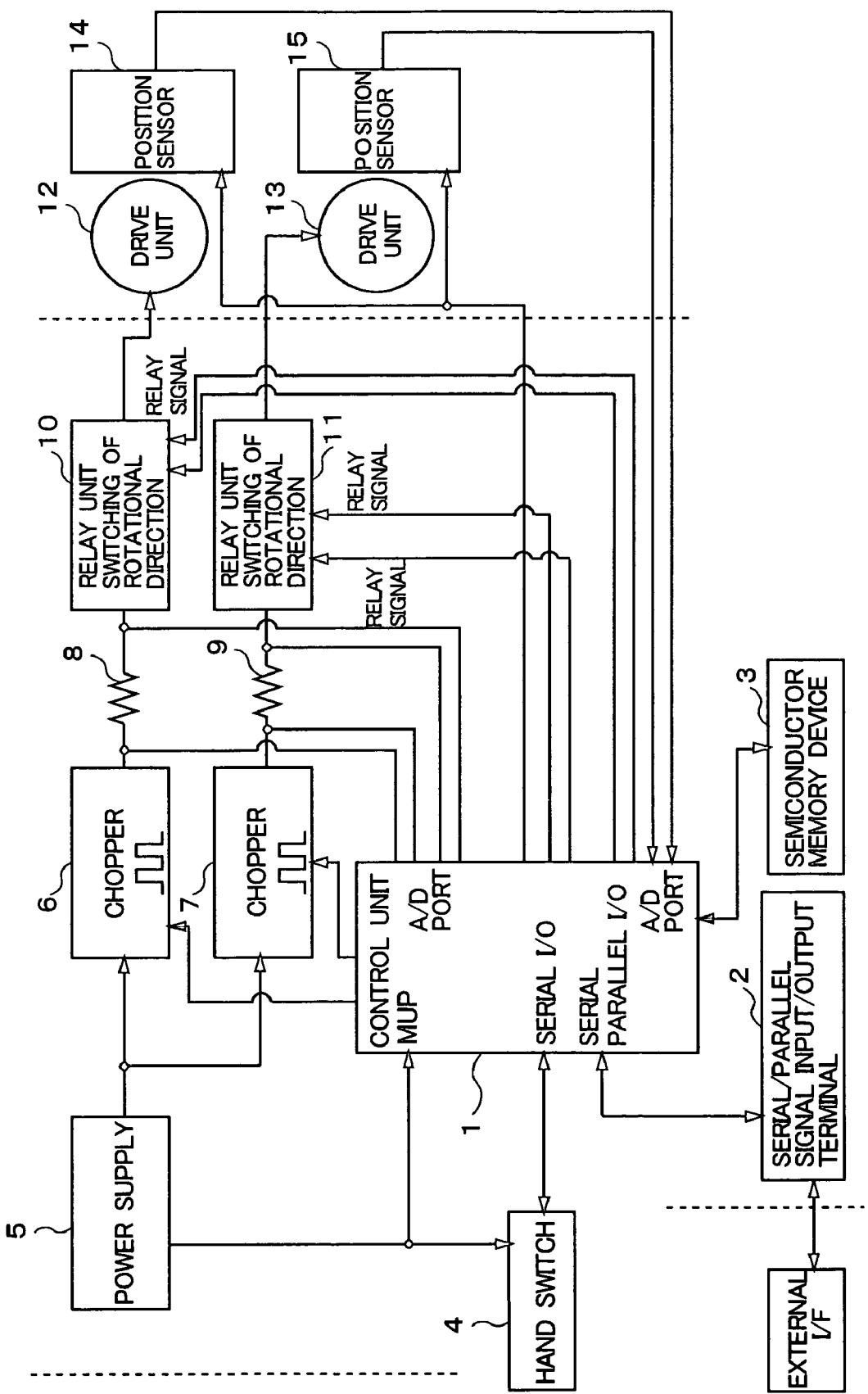
FIG. 1 is a block diagram showing an operation control apparatus for an electric bed according to an embodiment of the invention.

A preferred embodiment of the invention will be described specifically below with reference to the accompanying drawings. An electric bed to which an operation control apparatus according to the invention is adapted has a frame provided with a back bottom on which a part of a patient which is equivalent to an upper part lies, a knee bottom on which a part equivalent to thighs lies, a waist bottom on which a part equivalent to the waist lies, and a leg bottom on which a part equivalent to legs lie. A mattress is placed on the back bottom, the waist bottom, the knee bottom and the leg bottom. Of the bottoms, the back bottom, the knee bottom and the leg bottom are provided in such a way that their angles to the frame are changeable. The back bottom and the knee bottom are rotated by actuators. Generally, the leg bottom rotates in response to the rotation of the knee bottom. The waist bottom is generally fixed to the frame. The frame is lifted up and down by an actuator in a link mechanism. This structure is not restrictive but there are various structures available for electric beds. For example, one electric bed is designed to lift up and down only the back bottom. This type of electric bed does not have a drive unit for the knee bottom, which will be discussed below.

FIG. 1 is a block diagram showing the operation control apparatus for an electric bed according to the embodiment of the invention. In FIG. 1, a drive unit 12 is for lifting up and lifting down the back bottom. A drive unit for the knee bottom, which is not illustrated in FIG. 1, has a similar structure. A drive unit 13 is for lifting up and lifting down the frame. Connected to an MPU (MicroProcessor Unit) 1 are a hand switch (remote control switch) 4, a serial/parallel signal input/output terminal 2 connected to an external input, and a non-volatile semiconductor memory device (EEPROM) 3. A power supply 5 supplies power to the hand switch 4, the MPU 1 and choppers 6 and 7. Each of the choppers 6 and 7 converts the current from the power supply 5 to a pulse current and outputs the pulse current for a predetermined period in response to a control signal from the MPU 1. The output currents from the choppers 6 and 7 are detected by current detectors 8 and 9, respectively. The currents detected by the current detectors 8 and 9 are respectively input to relay units 10 and 11. The MPU 1 sends the relay units 10 and 11 signals indicating the rotational directions of motors of the associated actuators, and sends the drive units 12 and 13 signals on the numbers of rotations corresponding to the values of the currents output from the current detectors 8 and 9. The drive units 12 and 13 rotate the motors of their actuators by the numbers of rotations instructed by the MPU 1 in the directions instructed by the MPU 1.

As a result, the drive unit 12 protracts or retracts the piston rod of its actuator by a predetermined length to tilt the back bottom. The knee bottom is likewise lifted up and down in a predetermined pattern in response to an instruction from the MPU 1.

The drive unit 13 protracts or retracts the piston rod of its actuator by a predetermined length to set the frame high or low by a length instructed by the MPU 1.

A position sensor 14 detects the position of the piston rod of the actuator from a change in the slide resistance according to the amount of movement of the piston rod, and detects the tilt angles of the back bottom and the knee bottom from the positions of the associated piston rods. A position sensor 15 likewise detects the position of the piston rod of the actuator from a change in the slide resistance according to the amount of movement of the piston rod, and detects the height of the frame. The detection results are input to the MPU 1 and used therein for the feedback control of the amounts of driving of the drive units 12 and 13.

The control modes of the MPU 1 will be discussed below. When a patient or a caretaker operates the hand switch 4 to incline the back bottom and the knee bottom or set the back bottom and the knee bottom back in the horizontal state or to lift up or down the frame, the signal is input to the MPU 1 from the hand switch 4. The MPU 1 then sends control signals to the chopper 6, 7 and the relay unit 10, 11 to drive the drive unit 12, 13 in a predetermined direction for a given time to lift up or down the back bottom, the knee bottom or the frame.

At this time, the MPU 1 inputs (1) operation start points and operation end points of a bottom drive device and a frame drive device, (2) a drive start point and a drive end point of each bottom or a drive time of each bottom, and a type of the lift-up or lift-down operation of each bottom, (3) a drive start point and a drive end point of the frame, and a type of the lift-up or lift-down operation of the frame, to the memory device 3 and stores those pieces of information in the memory device 3. In this case, the MPU 1 sends the memory device 3 signals concerned with information on the input points of signals to be input from the hand switch 4, i.e., (1) the input points of an operation start signal and an operation end signal to the drive unit 12 or the bottom drive device, (2) the input point of a drive start signal for each bottom, the input point of a drive end signal for each bottom or the drive time for each bottom, and information indicating whether each drive signal requests lift-up or lift-down of each bottom to the drive unit 12 or the bottom drive device, and (3) the input point of a drive start signal for a frame, the input point of a drive end signal for a frame, and information indicating whether each drive signal requests lift-up or lift-down of the frame to the drive unit 13 or the frame drive device, and stores those pieces of information in the memory device 3. The information on the drive signals for the bottoms is stored in the memory device 3 for both the back bottom and knee bottom.

The memory device 3 stores data of a predetermined amount which is equal to or less than the capacity of the memory device 3, starting from latest data. When a personal computer (not shown) is connected to the serial/parallel signal input/output terminal 2 and a data output signal is input to the serial/parallel signal input/output terminal 2 from the personal computer, the MPU 1 reads stored data from the memory device 3 and sends the read data to the personal computer via the serial/parallel signal input/output terminal 2.

Accordingly, the personal computer can know the operational history of the electric bed. Specifically, the time of energization of the operation control apparatus according to the invention is computed from the input point of the operation start signal and the input point of the operation end signal to the drive unit 12 or the bottom drive device, and the time of energization of the actuator for driving the associated bottom is computed from the input point of the bottom drive start signal and the input point of the bottom drive end signal. The operation of each bottom and the operation of the frame during those energization times are stored in a time-sequential manner. Further, the number of times the hand switch 4 is operated and the number of repetitive depressions of the same button if depressed so are also stored. When the lift-up operations of the back bottom and the knee bottom are not made to respond to each other by the link mechanism, information indicating for which bottom a drive signal in question is generated is also stored. The amount of operational histories that can be stored in the memory device 3 depends on the memory capacity of the memory device 3.

When a trouble occurs, the MPU 1 sends data stored in the memory device 3 to the serial/parallel signal input/output terminal 2 in response to a request signal from the personal computer. Based on the data, the personal computer finds out the operation immediately before the point at which the trouble has occurred and analyzes the cause of the trouble.

When no trouble has occurred yet but a care manager needs to know the operational history of the electric bed, the care manager inputs a request signal to the operation control apparatus through the personal computer and receives and analyzes data from the operation control apparatus. Accordingly, the care manager can know how and when a user (a patient or a caretaker) has used the bed and can verify whether the care plan created himself or herself is adequate or not.

What is claimed is:

1. An operation control apparatus for an electric bed which has a bottom drive member for lifting up and down at least one of a back bottom and a knee bottom tiltably attached to a frame and a frame drive member for lifting up and down said frame and which operates said bottoms and frame of said bed by driving said bottom drive member or said frame drive member in response to a signal from a remote control switch or a fixed switch, said operation control apparatus comprising:

a memory device which stores operation start points and operation end points of said bottom drive member and said frame drive member, a drive start point of each bottom and a drive end point of each bottom or a drive time of each bottom, a type of a lift-up or lift-down operation of each bottom, a drive start point and a drive end point of said frame, and a type of a lift-up or lift-down operation of said frame, or a type of an operated button of said remote control switch or said fixed switch; and an output unit which outputs memory contents of said memory device in response to an external request signal, wherein said memory device stores data whose amount is equal to or less than a capacity of said memory device, starting from latest data, in a memory section.

2. The operation control apparatus according to claim 1, wherein said output unit transfers output data to a personal computer.

3. An operation control apparatus for an electric bed which has at least one drive member for lifting up and down at least one component of said electric bed in response to a signal from a remote control switch or a fixed switch, said operation control apparatus comprising:

a memory device which stores in a time-sequential manner an operational history of operation start points and operation end points of said at least one drive member, a drive stan point and a drive end point or a drive time of said at least drive member, a type of a lift-up or lift-down operation of said at least one component, a drive start point and a drive end point of said at least one component, and a type of a lift-up or lift-down operation of said at least one component or a type of an operated button of said remote control switch or said fixed switch; and an output unit which outputs memory contents of said memory device in response to an external request signal, wherein said memory device stores data whose amount is equal to or less than a capacity of said memory device, starting from latest data.

4. The operation control apparatus according to claim 3, wherein said output unit transfers output data to a personal computer.

5. An operation control system for an electric bed, the bed having a bottom drive member for lifting up and down at least one of a back bottom and a knee bottom and a frame drive member and which operates said bottom drive member or said frame drive member in response to a signal from a remote control switch or a fixed switch, said operation control system comprising:

a memory device which stores a time-sequential history of operation start points and operation end points of said bottom drive member and said frame drive member, a drive start point of each bottom and a drive end point of each bottom or a drive time of each bottom, a type of a lift-up or lift-down operation of each bottom, a drive start point and a drive end point of said frame, and a type of a lift-up or lift-down operation of said frame, or a type of an operated button of said remote control switch or said fixed switch; and an output unit which outputs memory contents of said memory device in response to an external request signal.

6. The operation control system according to claim 5, wherein said output unit transfers output data to a personal computer.

7. A method of controlling an electric bed comprising:

storing in a memory device a time-sequential history of operation stan points and operation end points of at least one bed component drive member, a drive start point and a drive end point or a drive time of said at least one drive member, a type of a lift-up or lift-down operation of said at least one bed component drive member, a drive start point and a drive end point of said bed component, and a type of a lift-up or lift-down operation of said be component or a type of an operated button of a remote control switch or a fixed switch operating said at least one bed component drive member, and;

outputting memory contents of said memory device in response to an output signal, wherein said memory device stores data whose amount is equal to or less than a capacity of said memory device, starting from latest data.

8. The method according to claim 7, wherein said outputting comprises transferring output data to a personal computer.

* * * * *